United States Patent
Marquès et al.

(10) Patent No.: US 8,584,333 B2
(45) Date of Patent: Nov. 19, 2013

(54) METHOD FOR MANUFACTURING A VEHICLE SEAT CUSHION ASSEMBLY

(75) Inventors: José Marquès, Vaux sur Seine (FR); Jean-Marie Chartrain, Velizy (FR)

(73) Assignee: Lear Corporation, Southfield, MI (US)

( * ) Notice: Subject to any disclaimer, the term of this patent is extended or adjusted under 35 U.S.C. 154(b) by 79 days.

(21) Appl. No.: 13/357,906

(22) Filed: Jan. 25, 2012

(65) Prior Publication Data

US 2013/0187432 A1    Jul. 25, 2013

(51) Int. Cl.
B68G 7/05    (2006.01)
A47C 7/18    (2006.01)

(52) U.S. Cl.
USPC ...... 29/91; 29/91.1; 297/452.48; 297/452.58; 112/475.01; 112/475.08

(58) Field of Classification Search
USPC .......... 29/91, 91.1, 91.5; 297/452.21, 452.48, 297/452.58; 112/475.01, 475.08
See application file for complete search history.

(56) References Cited

U.S. PATENT DOCUMENTS

| | | | |
|---|---|---|---|
| 3,270,394 A * | 9/1966 | Marsh et al. | 29/91.1 |
| 3,519,308 A * | 7/1970 | Kasman et al. | 297/452.58 |
| 4,663,211 A | 5/1987 | Kon | |
| 5,193,474 A | 3/1993 | Urai et al. | |
| 5,501,165 A | 3/1996 | Nagashima | |
| 5,669,670 A | 9/1997 | Haraguchi et al. | |
| 6,443,525 B1 | 9/2002 | Haupt | |
| 7,448,643 B2 | 11/2008 | Kuettner et al. | |
| 7,718,557 B2 | 5/2010 | Mikaelian | |
| 7,879,424 B2 | 2/2011 | Smith et al. | |
| 2011/0037243 A1 | 2/2011 | Laframboise et al. | |

FOREIGN PATENT DOCUMENTS

| | | |
|---|---|---|
| DE | 102008061867 A1 | 5/2010 |
| JP | 2001239081 A | 9/2001 |
| JP | 2001269493 A | 10/2001 |
| JP | 2002191478 A | 7/2002 |
| JP | 2002191877 A | 7/2002 |

OTHER PUBLICATIONS

Canh—"2010 Citroen DS3 Interior and Video Presentation Revealed, Coming to Australia in Q4 2010"; May 29, 2009;http://38kg.blogspot.com/2009/05/2010-citroen-ds3-interior-and-video.html—3 Pages.
Eddie Barrett Seat Company—Advertisement; http://www.barrettseats.com/; Sep. 29, 2011; 5 Pages.

(Continued)

Primary Examiner — Jermie Cozart
(74) Attorney, Agent, or Firm — Brooks Kushman P.C.

(57) ABSTRACT

A method for manufacturing a vehicle seat cushion assembly includes providing a first material to define an outer seating surface. A second material is sewn to the first material using first and second sewing lines disposed generally parallel to each other. A wadding material is disposed between the first and second materials and between the first and second sewing lines, and additional wadding material is disposed between the first and second materials adjacent to and not between the first and second sewing lines. The first and second materials are further sewn together using two additional sewing lines respectively disposed adjacent edges of the additional wadding material opposite the first and second sewing lines.

16 Claims, 3 Drawing Sheets

(56) References Cited

OTHER PUBLICATIONS

Action Import Motors—Race-Trim Suspension Seats; Advertisement; http://www.actionimport.com/Catalog_EMPI/Race-Trim_Seats.htm; Sep. 29, 2011; 10 Pages.

Moore Parts—Advertisement; http://www.mooreparts.com/store.category/22/388/Seat-Race-Trim-/; Sep. 29, 2011; 5 Pages.

Canh—"2010 Citroen DS3 Interior and Video Presentation Revealed, Coming to Australia in Q4 2010"; May 29, 2009;—3 Pages.

Eddie Barrett Seat Company—Sep. 29, 2011; 5 Pages.

Action Import Motors—Race-Trim Suspension Seats; Advertisement; Sep. 29, 2011; 10 Pages.

Moore Parts—Sep. 29, 2011; 5 Pages.

* cited by examiner

METHOD FOR MANUFACTURING A VEHICLE SEAT CUSHION ASSEMBLY

TECHNICAL FIELD

The present invention relates to a seat cushion assembly and method of manufacturing a seat cushion assembly.

BACKGROUND

Vehicle seats are made from a variety of different materials and are configured in countless shapes and sizes to accommodate the particular requirements of the vehicle in which they are used. A common seating material used in passenger and commercial vehicles is leather—either real leather made from the tanned hide of an animal, or synthetic leather, which emulates the appearance and feel of real leather. Seat cushions may be made up of a top surface of leather and an undersurface of a stiff backing material attached to a backside of the leather, with foam padding inserted between the two layers.

Although the stiff backing material may facilitate manufacturing and assembly processes, using such a material on a vehicle seat cushion has inherent drawbacks. For example, the stiff backing material does not stretch in the same way that the leather upper material does. Thus, when a seat cushion having a stiff backing is attached to side bolsters, the bolsters are apt to deform as a result of the force applied by the backing material when a person occupies the seat. It would be more desirable to have a seat cushion with increased elasticity so that the cushion would accept more of the deformation, thereby leaving the bolsters and other seat structures intact.

Another problem with some seat cushions is that they employ a thick seat trim cover panel, for example, a panel made of three layers—e.g., an upper material, a foam wadding material, and a backing material. Such a cushion may not lie flat as it is attached to the frame and other seat structures. The process of attaching the backing material to the leather material with a foam padding in between may result in a cushion having a backside surface that is not planar. In such a case, attachment devices, such as wire, straps, etc. must be utilized to not only attach the seat cushion to the seat structure, but also to pull down any edges or corners, and the center of the trim cover panel, so that the cushion remains flat.

Another reason that a cushion may be difficult to attach to a seat structure is because many cushions are manufactured with a generally rectangular perimeter. This facilitates the manufacturing processes, by making material pieces that are easy to cut and assemble. For example, if the entire seat cushion has a generally rectangular perimeter, the piece or pieces of foam padding can also have a generally rectangular shape, thereby making it easier to insert the foam padding into pre-sewn pockets formed by the leather and the stiff backing material. Despite the ease of manufacturing, the rectangular shape may not be desirable from a form and fit perspective.

It would therefore be desirable to provide a seat cushion assembly and method of manufacture that overcomes some or all of the aforementioned problems, by providing a seat cushion that reduces the deformation side bolsters and other attached seat components, and presents a more planar surface for easier attachment to a seat structure.

SUMMARY

Embodiments of the present invention include a method for manufacturing a vehicle seat cushion assembly. The method includes the steps of providing a first material to define an outer seating surface, and sewing a second material to the first material using first and second sewing lines generally parallel to each other. A wadding material is disposed between the first and second materials and between the first and second sewing lines. Additional wadding material is disposed between the first and second materials adjacent to and not between the first and second sewing lines. The first and second materials are sewn together using two additional sewing lines respectively disposed adjacent edges of the additional wadding material opposite the first and second sewing lines.

Embodiments of the invention also include a method for manufacturing a vehicle seat cushion assembly that includes the steps of providing a first non-rectangular material to define an outer seating surface, and providing a second non-rectangular material having a perimeter generally parallel to a perimeter of the first material. The second material is sewn to the first material using two generally parallel sewing lines, which define an interior space between the first and second materials. A first amount of wadding material is disposed in the interior space, and a second amount of wadding material is disposed between the first and second materials adjacent one of the two generally parallel sewing lines. A third amount of wadding material is disposed between the first and second materials adjacent the other one of the two generally parallel sewing lines. The first and second materials are sewn together using two additional sewing lines respectively disposed adjacent edges of the second and third amount of wadding material opposite the interior space.

Embodiments of the invention further include a vehicle seat cushion assembly, which includes a first material defining an outer seating surface, and a second material having a greater stretchability than the stretchability of the first material. The second material is attached to an underside of the first material, and a wadding material is disposed between the first and second materials.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
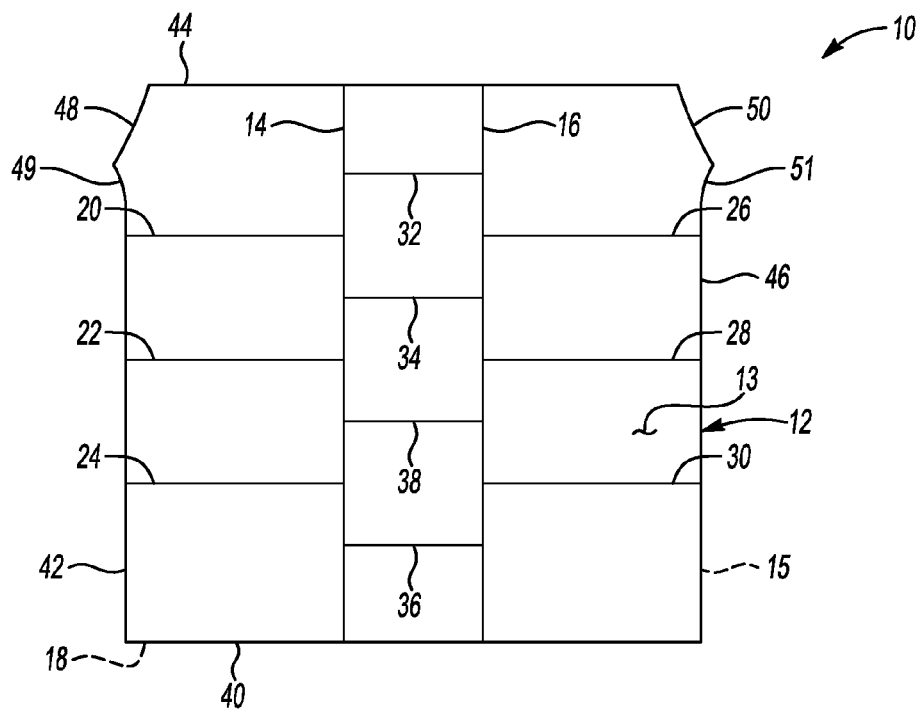
FIG. 1 shows a vehicle seat cushion assembly in accordance with an embodiment of the present invention.

FIG. 1 shows a vehicle seat cushion assembly 10 in accordance with an embodiment of the present invention. The seat cushion 10 includes a first material 12, which may be, for example, leather. The first material 12 defines an outer seating surface 13, which will be the surface contacting an occupant of the seat. It is worth noting that the seat cushion 10 is so named because it is, in general, a cushion used in a seat assembly; it may be possible, however, to use such a cushion for the seat portion of the seat assembly or the back portion of the seat assembly as desired. The material 12 also includes an underside 15, which is not visible in FIG. 1. Prominent on the outer surface 13 of the cushion assembly 10 are first and second sewing lines 14, 16, which are disposed generally parallel to each other. The sewing lines 14, 16 are used to attach the first material 12 to a second material 18, which is attached to the underside 15 of the material 12.

Also shown in FIG. 1 are additional sewing lines 20-38, which as explained in more detail below further secure the first material 12 to the second material 18 while securing wadding material therebetween. An outer perimeter of the first material 12 is generally defined by six linear edge segments 40, 42, 44, 46, 48, 50. In addition to the linear segments, an outer perimeter of a seat cushion in accordance with embodiments of the present invention may have one or more curved segments, such as the segments 49, 51. Other embodiments may have a curved perimeter with few or no linear segments. Such a non-rectangular perimeter for the seat cushion assembly 10 provides advantages over standard rectangular configurations by providing better fit in the highly contoured seats of many modern vehicles. A non-rectangular configuration may, however, necessitate certain changes to standard assembly processes, at least some of which are manifest in embodiments of the present invention.

Figure 2:
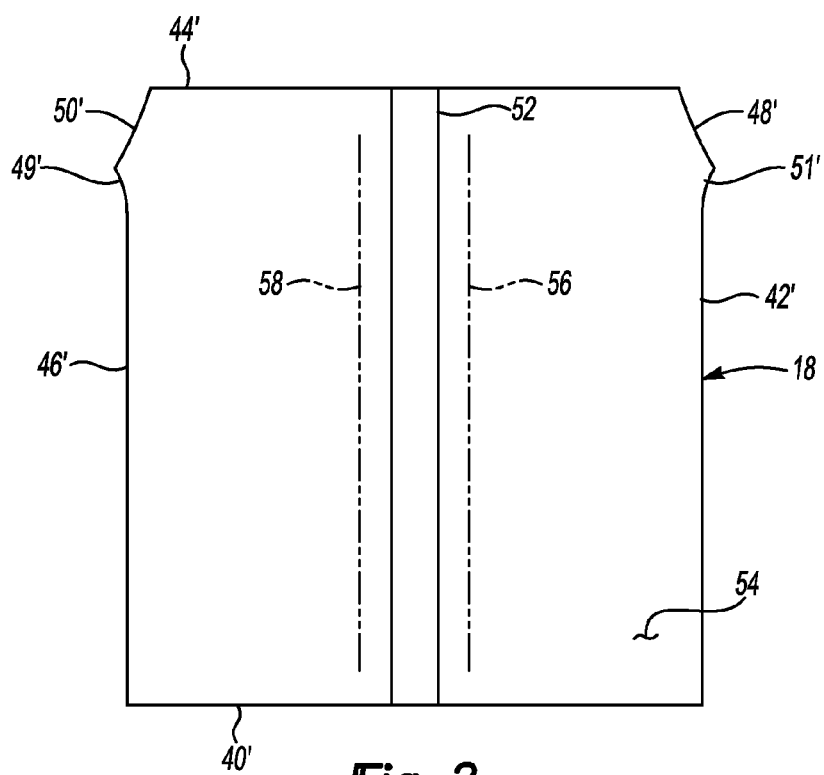
FIG. 2 shows an elastic backing material used with the seat cushion shown in FIG. 1.

FIG. 2 shows the second material 18 in more detail. In particular, the second material 18 has a perimeter that is generally parallel to the perimeter of the first material 12, and is also generally defined by six linear edge segments 40', 42', 44', 46', 48', 50', with the prime symbol (') and associated numerical label indicating correspondence to the edges of the first material 12. As with the first material 12, the perimeter of the second material 18 also includes curved segments 49', 51'. Unlike the backing material used in other seat cushion assemblies, the second material 18 is stretchable and has a low permanent set deformation. In at least some embodiments, the material 18 has a stretchability that is greater than the stretchability of the first material 12. This helps to overcome problems associated with seat cushion assemblies having a stiff backing material, which tends to pull on the side or bolster cushions of the seat assembly when an occupant is in the seat. Thus, in embodiments of the present invention having the lower stiffness backing material, such as the material 18, the backing material deforms at least as much or more as the outer material, such as the material 12. This can lead to a better fit and greater comfort for the vehicle occupant. The material 18 may be, for example, a woven tulle or other similarly elastic material.

FIG. 2 also shows a hook and loop fastener 52 in the form of a long strip disposed between edges 40' and 44'. The fastener 52 is attached to a backside 54 of the material 18, which will be an outer surface. Is configured to cooperate with a mating hook and loop fastener attached to a portion of the seat structure (not shown). In this way, embodiments of the present invention help to eliminate the problem of non-planar back surfaces on seat cushions, which can make it difficult to attach the seat cushion so that it lays flat as required. Also shown in FIG. 2, are the markings for the first and second sewing lines 14, 16 (see FIG. 1), which are denoted by location lines 56, 58 shown in phantom. The line 56 corresponds to the location of the first sewing line 14, while the second line 58 corresponds to the location of the second sewing line 16. These lines appear to be reversed from each other when comparing FIGS. 1 and 2, because it is the backside 54 of the second material 18 that is shown facing upward in FIG. 2.

Figure 3A:
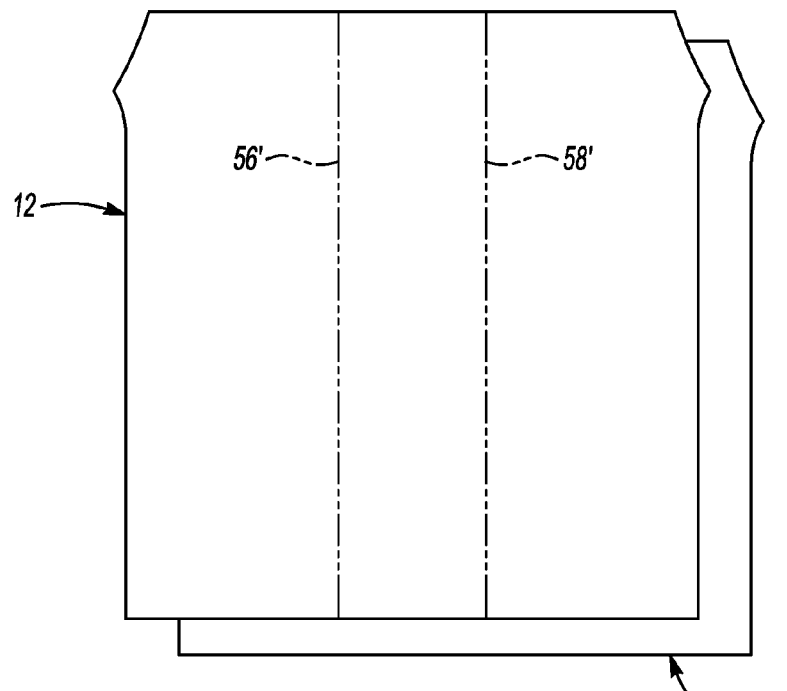
FIGS. 3A and 3B show an assembly process for the vehicle seat cushion assembly shown in FIG. 1.
Figure 3B:
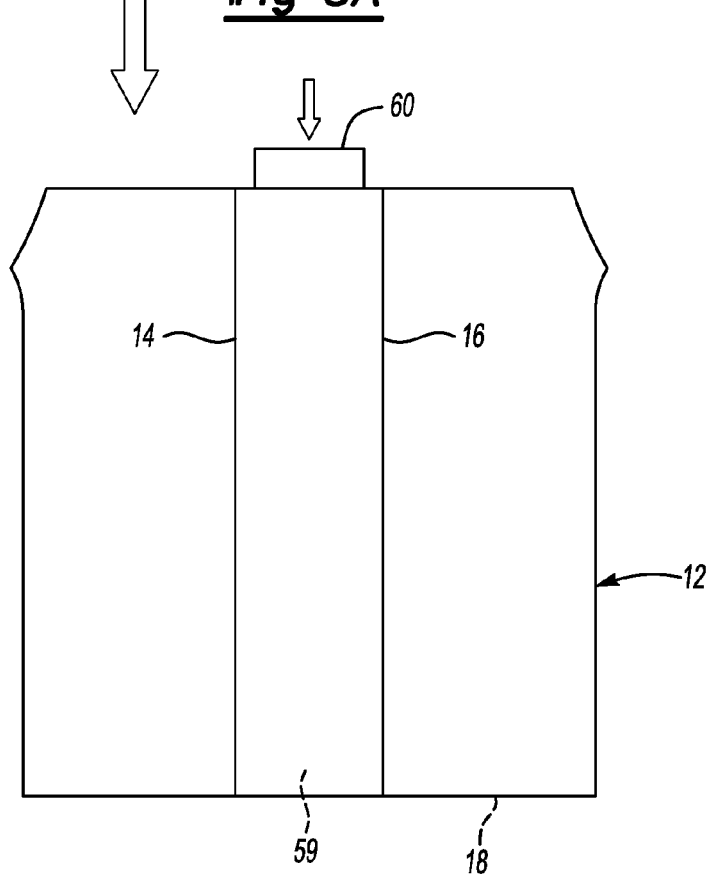

FIGS. 3A and 3B show a portion of the assembly process for the seat cushion 10. As shown in FIG. 3A, the first material 12 is placed over the second material 18 such that location lines 56', 58' on the material 12 are aligned with the location lines 56, 58 (not visible in FIG. 3A) on the second material 18. Then, as shown in FIG. 3B, the first and second sewing lines 14, 16 are sewn, thereby securing the first and second materials 12, 18 to each other. Sewing the two pieces of material 12, 18 to each other using the first and second sewing lines 14, 16 creates an interior space 59 between the first and second materials 12, 18 and between the first and second sewing lines 14, 16. Assembly of the vehicle seat cushion 10 continues when a first amount of wadding material 60 is disposed into the interior space 59. The wadding material 60, as with the other wadding material described herein, may comprise at least one of a urethane foam or a bio-based foam, such as foam created from a soy polyol, although other types of wadding material may be used as desired.

Figures 4A, 4B:
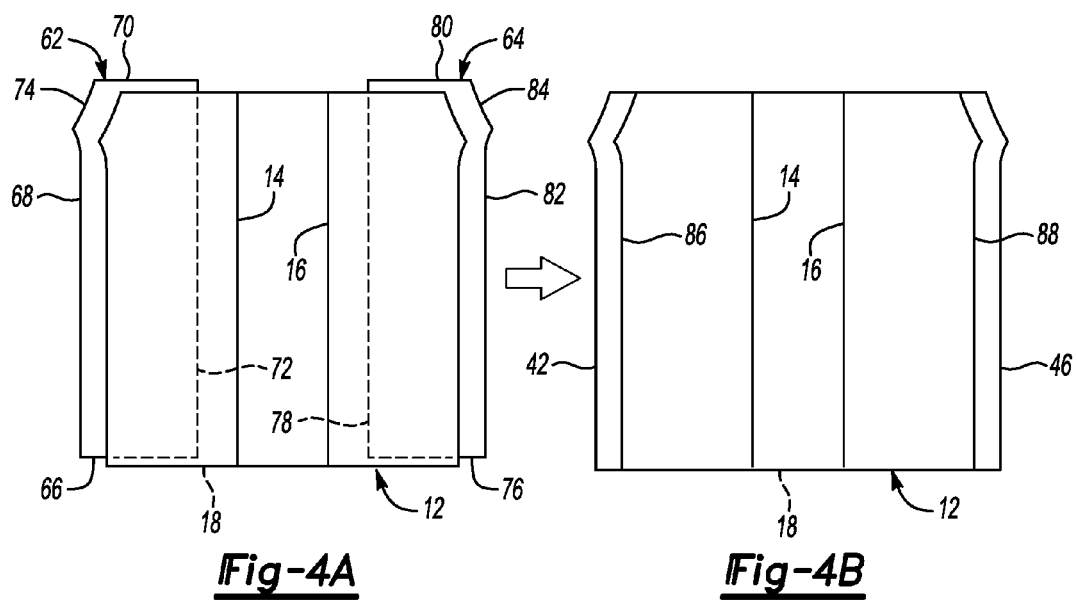
FIGS. 4A and 4B show another portion of the assembly process for the vehicle seat cushion assembly shown in FIG. 1.

FIGS. 4A and 4B show additional assembly processes for the seat cushion 10. Specifically, additional wadding material in the form of second and third amounts of wadding material 62, 64 are disposed between the first and second materials 12, 18. These additional pieces of wadding material 62, 64 are each disposed adjacent to one of the first or second sewing lines, 14, 16. To accommodate the non-rectangular perimeter of the first and second materials 12, 18, each of the wadding materials 62, 64 also has a non-rectangular perimeter. For example, the wadding material 62 has a perimeter that includes five generally linear segments 66, 68, 70, 72, 74, that are generally parallel to corresponding edges of the first and second materials 12, 18. Similarly, the wadding material 64 has a perimeter that includes five generally linear segments 76, 78, 80, 82, 84 also corresponding to edges of the first and second materials 12, 18. Each of the wadding materials 62, 64 also includes at least one curved segment in addition to their respective linear segments.

FIG. 4B shows a further process of the assembly of the seat cushion 10. In particular, once the wadding materials 62, 64 are inserted between the first and second materials 12, 18, the first and second materials 12, 18 are further sewn together with two additional sewing lines 86, 88 which are respectively disposed adjacent the edges 68, 82 of the wadding materials 62, 64. As shown in FIG. 4B, the sewing lines 86, 88 include two generally linear segments which are generally parallel to the respective edges of the wadding 62, 64. Although the sewing lines 86, 88 appear to be disposed at a long distance from the edges 42, 46 of the seat cushion 10, the distances are exaggerated in FIG. 4B for clarity, and in practice may be, for example, a distance of approximately 5 mm.

It is worth noting that the order of inserting the wadding material and sewing the first and second materials 12, 18 together is chosen at least in part due to the non-rectangular shape of the seat cushion 10. As noted above, the non-rectangular shape provides advantages of form, fit and ease of assembly over standard rectangular shaped seat cushions. With rectangular cushions, however, it is possible to sew four parallel lines, such as the lines 14, 16, with two additional lines near the outer edges of the seat cushion 10, thereby creating three separate interior spaces, similar to the interior space 59 shown in FIG. 3B. This is possible, because it is a relatively easy task to insert rectangular pieces of wadding material into these interior spaces, but it can be problematic when non-rectangular pieces are used.

Figure 5:
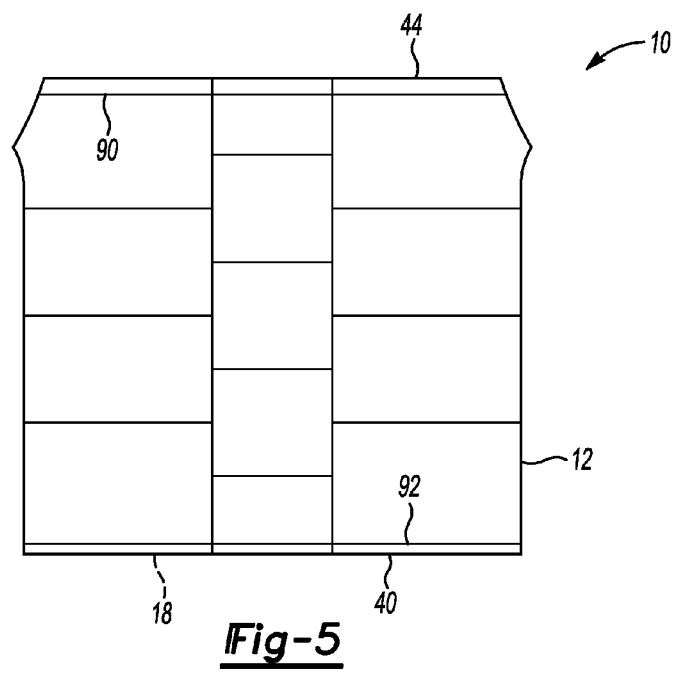
FIG. 5 shows additional steps in the assembly process for the vehicle seat cushion assembly shown in FIG. 1.

Thus, embodiments of the present invention specifically sew the first and second sewing lines 14, 16, insert the first wadding material 60, and then insert the second and third pieces of wadding material 62, 64 prior to sewing the additional two sewing lines 86, 88. By using such a process with the steps provided in this general order, a non-rectangular seat cushion, such as the seat cushion 10 can be produced. Finally, FIG. 5 shows two additional sewing lines 90, 92 sewn perpendicular to the first and second sewing lines 14, 16 to complete the capture of the wadding material 60, 62, 64 between the first and second materials 12, 18. As with the sewing lines 86, 88 shown in FIG. 4B, the sewing lines 90, 92 may be disposed very close to their respective edges 44, 40, for example, at a distance of approximately 5 mm. Therefore, the sewing lines 86, 88, 90, 92 are not readily apparent in FIG. 1, which shows the assembled seat cushion 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for manufacturing a vehicle seat cushion assembly, comprising:
   providing a first material to define an outer seating surface;
   sewing a second material to the first material using first and second sewing lines generally parallel to each other;
   disposing a wadding material between the first and second materials and between the first and second sewing lines;
   disposing additional wadding material between the first and second materials adjacent to and not between the first and second sewing lines; and
   sewing the first and second materials together using two additional sewing lines respectively disposed adjacent edges of the additional wadding material opposite the first and second sewing lines thereby at least partially forming said vehicle seat cushion assembly.

2. The method of claim 1, further comprising sewing the first and second materials together with sewing lines generally perpendicular to the first and second sewing lines.

3. The method of claim 1, further comprising attaching a hook and loop fastener to an outer surface of the second material.

4. The method of claim 1, wherein the first material is leather and the second material is a woven tulle.

5. The method of claim 1, wherein the first and second materials have generally parallel perimeters with at least six generally linear segments.

6. The method of claim 1, wherein the wadding material is a foam comprising at least one of a urethane material or a bio-based material.

7. The method of claim 1, wherein the additional wadding material includes two pieces of wadding material, each of which has a perimeter with at least five generally linear segments.

8. The method of claim 7, wherein the two additional sewing lines each include two generally linear segments generally parallel to respective edges of the two pieces of wadding material.

9. A method for manufacturing a vehicle seat cushion assembly, comprising:
   providing a first non-rectangular material to define an outer seating surface;
   providing a second non-rectangular material having a perimeter generally parallel to a perimeter of the first material;
   sewing the second material to the first material using two generally parallel sewing lines, thereby defining an interior space between the first and second materials;
   disposing a first amount of wadding material in the interior space;
   disposing a second amount of wadding material between the first and second materials adjacent one of the two generally parallel sewing lines;
   disposing a third amount of wadding material between the first and second materials adjacent the other one of the two generally parallel sewing lines; and
   sewing the first and second materials together using two additional sewing lines respectively disposed adjacent edges of the second and third amounts of wadding material opposite the interior space thereby at least partially forming said vehicle seat cushion assembly.

10. The method of claim 9, further comprising sewing the first and second materials together with sewing lines generally perpendicular to the two generally parallel sewing lines.

11. The method of claim 10, further comprising attaching a hook and loop fastener to an outer surface of the second material.

12. The method of claim 9, wherein the first material is leather and the second material is a woven tulle.

13. The method of claim 9, wherein the first and second materials have generally parallel perimeters with at least six generally linear segments.

14. The method of claim 9, wherein the amounts of wadding material comprise at least one of a urethane foam or a bio-based based foam.

15. The method of claim 9, wherein each of the second and third amounts of wadding material has a perimeter with at least five generally linear segments.

16. The method of claim 15, wherein the two additional sewing lines each include two generally linear segments generally parallel to respective edges of the second and third amounts of wadding material.

* * * * *